United States Patent
Hart et al.

(10) Patent No.: US 7,306,294 B2
(45) Date of Patent: Dec. 11, 2007

(54) APPARATUS AND METHOD FOR PNEUMATICALLY CONTROLLED GRADUATED BRAKE PRESSURE RELEASE FOR FREIGHT TRAIN BRAKE SYSTEM

(75) Inventors: James Hart, Trafford, PA (US); Thomas Engle, Clayton, NY (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 226 days.

(21) Appl. No.: 10/453,130

(22) Filed: Jun. 3, 2003

(65) Prior Publication Data

US 2003/0193237 A1   Oct. 16, 2003

Related U.S. Application Data

(62) Division of application No. 09/894,053, filed on Jun. 28, 2001, now Pat. No. 6,609,769.

(60) Provisional application No. 60/214,511, filed on Jun. 28, 2000.

(51) Int. Cl.
*B60T 15/54* (2006.01)
(52) U.S. Cl. .......................... 303/74; 303/36
(58) Field of Classification Search .................. 303/74, 303/36, 77, 78, 82
See application file for complete search history.

(56) References Cited

U.S. PATENT DOCUMENTS

| | | |
|---|---|---|
| 3,018,138 A | 1/1962 | Wilson et al. |
| 3,208,801 A | 9/1965 | McClure |
| 3,510,173 A | 5/1970 | Gnavi et al. |
| 3,539,226 A | 11/1970 | Barber |
| 3,583,771 A | 6/1971 | Dressler, Jr. |
| 3,610,707 A | 10/1971 | Kondo |
| 3,799,623 A | 3/1974 | Wickham et al. |
| 3,887,239 A | 6/1975 | Engle |
| 3,937,430 A | 2/1976 | Engle |
| 4,033,632 A | 7/1977 | Wilson |
| 4,066,230 A | 1/1978 | Nohmi et al. |
| 4,105,257 A | 8/1978 | Engle et al. |
| 4,162,107 A | 7/1979 | Bazilevich et al. |
| 4,316,640 A | 2/1982 | Cripe |
| 4,344,138 A | 8/1982 | Frasier |
| 4,384,695 A | 5/1983 | Nohmi et al. |
| 4,533,185 A | 8/1985 | Krause |

(Continued)

*Primary Examiner*—Xuan Lan Nguyen
(74) *Attorney, Agent, or Firm*—Buchanan Ingersoll & Rooney PC

(57) ABSTRACT

A release graduating valve for freight brake control is provided for a railcar having a pneumatic control valve, emergency and auxiliary reservoirs each normally charged with pressurized fluid from a brake pipe and a fluid pressure activated brake cylinder device for applying the brakes on the railcar. A selectively operable release graduating valve can include a graduated release valve and a changeover valve which selectively interposes the graduated release valve to exhaust brake cylinder pressure in a graduated manner responsive to brake pipe pressure. Alternatively, the changeover valve can isolate the graduated release valve and direct the pneumatic control valve to exhaust brake cylinder pressure in a conventional manner. The changeover valve can be operated responsive to the pressure in an air pipe supplied with pressurized fluid from a remote source. A permanent release graduating valve can be provided wherein the changeover valve is omitted, in which case the brake cylinder exhaust is always controlled by the graduated release valve. Either configuration of the release graduating valve could be also be utilized in an ECP freight brake control system.

3 Claims, 13 Drawing Sheets

U.S. PATENT DOCUMENTS

| | | |
|---|---|---|
| 4,558,907 A | 12/1985 | Reiss et al. |
| 4,852,007 A | 7/1989 | Yasunobu et al. |
| 4,859,000 A | 8/1989 | Deno et al. |
| 4,946,229 A | 8/1990 | Deno et al. |
| 5,018,689 A | 5/1991 | Yasunobu et al. |
| 5,083,843 A | 1/1992 | Engle |
| 5,335,974 A | 8/1994 | Klink |
| 5,387,030 A | 2/1995 | Gayfer et al. |
| 5,393,129 A | 2/1995 | Troiani et al. |
| 5,415,465 A | 5/1995 | Skantar et al. |
| 5,460,435 A | 10/1995 | Chew |
| 5,603,556 A | 2/1997 | Klink |
| 5,630,565 A | 5/1997 | Lumbis |
| 5,676,431 A | 10/1997 | McLaughln et al. |
| 5,721,683 A | 2/1998 | Joyce, Jr. et al. |
| 5,722,736 A | 3/1998 | Cook |
| 5,746,486 A | 5/1998 | Paul et al. |
| 5,785,392 A | 7/1998 | Hart |
| 5,808,370 A | 9/1998 | Bezos |
| 5,833,325 A | 11/1998 | Hart |
| 5,927,822 A | 7/1999 | Hart |
| 5,975,651 A | 11/1999 | Bezos |
| 5,984,426 A | 11/1999 | Hart |
| 5,984,427 A | 11/1999 | Kettle, Jr. |
| 6,227,521 B1 | 5/2001 | Scott |

CHANGEOVER CONTROL BY TRAINLINED M.R. PIPE
(INITIAL CHARGE AND NORMAL DIRECT RELEASE SERVICE)

(SET FOR GRADUATED RELEASE OPERATION)

PRESSURE SENSING CHANGOVER VALVE
(INITIAL CHARGE AND NORMAL DIRECT RELEASE SERVICE)

(CHARGEING - PRESSURE AT CRITICAL POINT)

AFTER CHANGEOVER POINT HAS BEEN EXCEEDED
(GRADUATED RELEASE SERVICE)

APPARATUS AND METHOD FOR PNEUMATICALLY CONTROLLED GRADUATED BRAKE PRESSURE RELEASE FOR FREIGHT TRAIN BRAKE SYSTEM

CROSS REFERENCE TO RELATED APPLICATION

This application is a divisional application of patent application Ser. No. 09/894,053, filed Jun. 28, 2001 now U.S. Pat. No. 6,609,769, which claimed priority from U.S. Provisional Application Ser. No. 60/214,511, filed Jun. 28, 2000.

BACKGROUND

This invention relates generally to freight train brake control systems, and more particularly, to an apparatus and method for a pneumatically controlled graduated release of brake cylinder pressure in a freight train brake control system.

In conventional freight train braking systems controlled by a pneumatic control valve, pressurized fluid is utilized to control braking functions on each car of the train. One or more locomotives and each car are interconnected by a brake pipe which supplies pressurized fluid from a main reservoir on the locomotive to reservoirs on each car. Each car in a standard pneumatically operated freight braking system has onboard a reservoir, typically divided into emergency and auxiliary compartments which are charged via the brake pipe, a pneumatic control valve (PCV) and a fluid pressure activated brake cylinder device. The PCV selectively communicates between the brake pipe, each reservoir compartment, the brake cylinder device and the atmosphere. The PCV controls the operation of the brakes on the car by controlling the access of pressurized fluid between the brake cylinder and the reservoirs or the atmosphere. The operation of the PCV is controlled by the engineer from the locomotive by adjusting the pressure in the brake pipe. Basically, a reduction in brake pipe pressure signals the PCV to admit pressurized fluid from a reservoir into the brake cylinder device to apply the brakes. Conversely, an increase in brake pipe pressure signals the PCV to vent the brake cylinder to the atmosphere thereby releasing the brakes.

Overall, the conventional pneumatic braking system utilizing the PCV has proven to be a very safe and reliable system. However, a couple of disadvantages of the PCV controlled system are that it takes time for the pressure change initiated at the locomotive to propagate throughout what may be hundreds of cars. As a result, the PCV on each car senses the pressure change sequentially such that the brakes on each car are applied in sequence rather than simultaneously. The PCV on cars near the locomotive will sense the pressure change sooner and thus the brakes on that car will be applied in advance of the brakes on cars down the line.

Another disadvantage is that once the brakes are applied, the only way to release them is to vent the brake cylinder to atmosphere, thus completely exhausting all pressure from the brake cylinder. In other words, the brake cylinder pressure cannot be partially reduced. Either all of the pressure must be kept or it all must be dumped. Furthermore, once the brake cylinder pressure is vented it can take time to recharge the brake pipe and reservoirs sufficiently to make further brake applications.

Prior art devices include the use of retainer valves with ABDW, ABDX type equipment to "retain" a portion of the brake cylinder pressure upon a direct release.

A relatively recent development in freight train braking controls is the Electrically Controlled Pneumatic (ECP) brake control system. In a conventional ECP system, an electronic controller (EC) is provided on each car along with solenoid operated valves which control the exchange of pressure between the brake cylinder device and the reservoirs or the atmosphere, basically taking over the functions of the PCV. Thus, the EC directly controls the brake cylinder and may be referred to as a brake cylinder control (BCC) type ECP system.

Initially, this BCC type ECP system has been tested as an overlay system on the conventional pneumatic system, with the PCV functioning as a back-up brake control device. However, all electronic BCC type ECP brake control systems are being prepared and the American Association of Railroads (AAR) is in the process of promulgating certain requirements regarding minimum equipment and operating conditions for such ECP systems.

One of the advantages of the BCC type system is that the EC is electrically signaled from the locomotive to operate the brake cylinder device. Thus, the brake signal is propagated essentially instantaneously and the brakes on every car can be actuated at virtually the same time. Another advantage is that the level of brake cylinder pressure is adjustable because the solenoid valves can partially vent brake cylinder pressure without completely exhausting all of the pressure to the atmosphere. As a result, the engineer can signal the EC to increase or decrease the braking force by any amount desired.

However, one disadvantage is the cost of implementing such an ECP system. For example, the AAR minimum requirements include, among other things, the requirement of a 2500 W power source on the locomotive, a 230 VDC trainline cable and a communications device one every car each with having a battery as a back-up power source. These requirements impose a significant cost factor.

Accordingly, there is a need for a device which provides a pneumatically controllable graduated release of brake cylinder pressure to obtain the graduated release advantages of the ECP system without the need for all of the associated electrical equipment and costs.

SUMMARY

A release graduating valve (RGV) according to the invention is preferably integrated into a pneumatic control valve, such as an otherwise standard ABDX, or ABDX-L, for use in either conventional pneumatically braked freight trains, or in unit trains of similarly equipped cars.

In normal freight train service, the RGV must provide direct release in concert with all other cars in the train, many or most of which typically would not be equipped with an RGV. Consequently, the RGV preferably includes a changeover valve portion for selectively switching between a graduated release mode and a direct release mode.

In the conventional direct release mode, the changeover valve isolates the graduated release portion of the RGV to permit the PCV to exhaust brake cylinder pressure in a conventional manner. In the graduated release mode, the changeover valve interposes a metering valve portion which exhausts brake cylinder pressure generally proportional to a reduction in pressure in the brake pipe.

The changeover valve can be selectively actuated responsive to the pressure in a secondary trainlined air pipe, for example a main reservoir pipe, which is supplied with pressurized fluid from a remote source. Alternatively, the changeover valve can be responsive to brake pipe pressure such that a secondary trainlined air pipe is not necessary. In this case, a brake pipe sensor valve portion can additionally be provided for controlling the activation of the RGV.

As an alternative to the selectively operable configuration, the RGV could also be provided in a "permanent" version. A permanent RGV is one in which there is no changeover valve portion to permit an optional direct release. Thus, brake cylinder pressure can routinely be exhausted in a graduated manner.

In any event, the selectively actuable RGV is the presently preferred type. Any car equipped with a selectively operable RGV would be capable of operation in a train of standard (non-equipped) cars for switching, positioning of equipment, and simply allows the fullest, most economical use of the car in any service for which it was otherwise suitable, without special handling procedures.

In a unit train of similarly equipped cars, graduated release operation of the individual car brakes can provide several benefits, and this may be one application for the "permanent" version. For example, the partial release of brakes may permit reduction of friction braking as a train slows to the desired speed on a downgrade, in order to use a higher percentage of dynamic braking to retard the train, with the benefit of reducing wear of the friction brake shoes. Additionally, the gradual release of brakes provides smoother control of slack, reducing inter-train forces and the damage it can cause. This is especially true when pulling a train out of a "sag." Moreover, a saving of air and locomotive fuel will be realized. This savings resulting from being able to reduce braking in undulating territory and avoid either slowing the train unnecessarily or applying wasteful power braking in order to avoid releasing the brakes. This situation occurs when the train is slowing below the desired speed, but the engineer realizes that heavier braking will be required on a downgrade ahead. The availability of graduated release avoids the necessity to completely release brakes, thereby saving the air and time that would be necessary to re-apply them to a higher degree when needed on the increased downgrade. A unit train of cars equipped with the release graduating valves described herein can use the graduated release feature to provide improved brake performance.

Further details, objects, and advantages of the invention will become apparent from the following detailed description and the accompanying drawings figures of certain embodiments thereof.

BRIEF DESCRIPTION OF THE DRAWING FIGURES

A more complete understanding of the invention can be obtained by considering the following detailed description in conjunction with the accompanying drawings, in which.

DETAILED DESCRIPTION OF CERTAIN EMBODIMENTS

Figure 1:
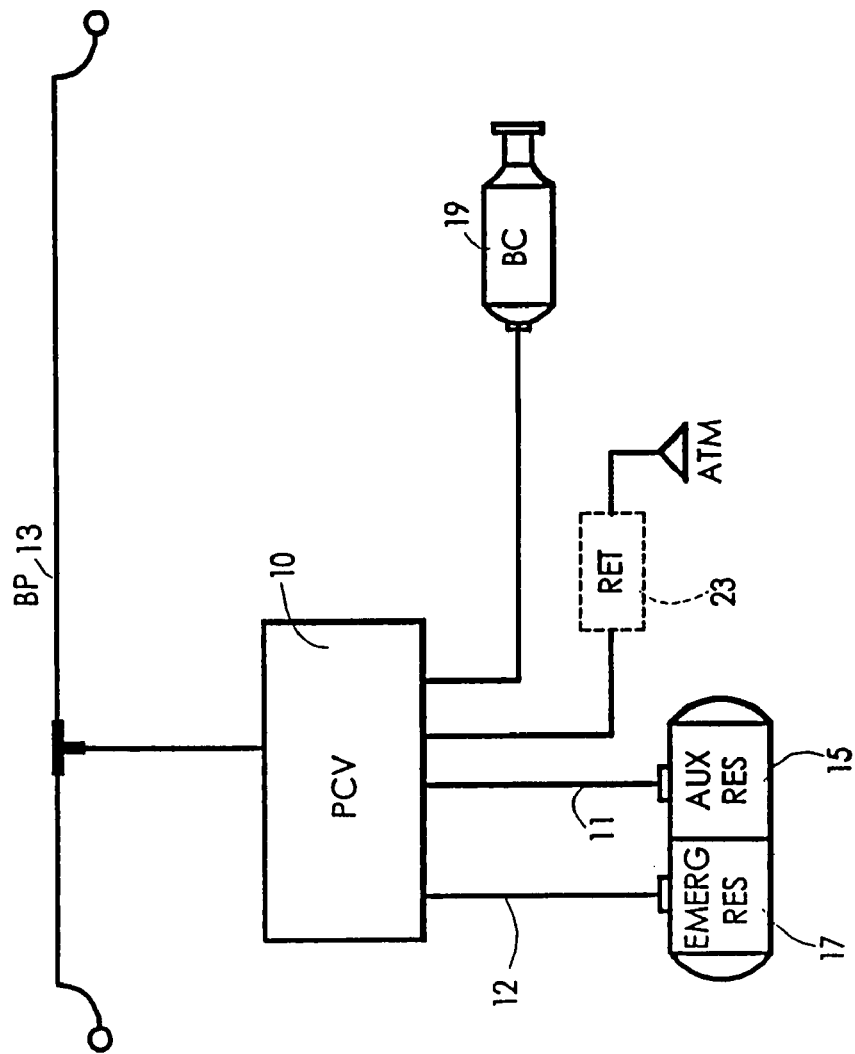
FIG. 1 is a diagrammatic representation which illustrates a prior art type pneumatic freight train braking system.
Figure 2:
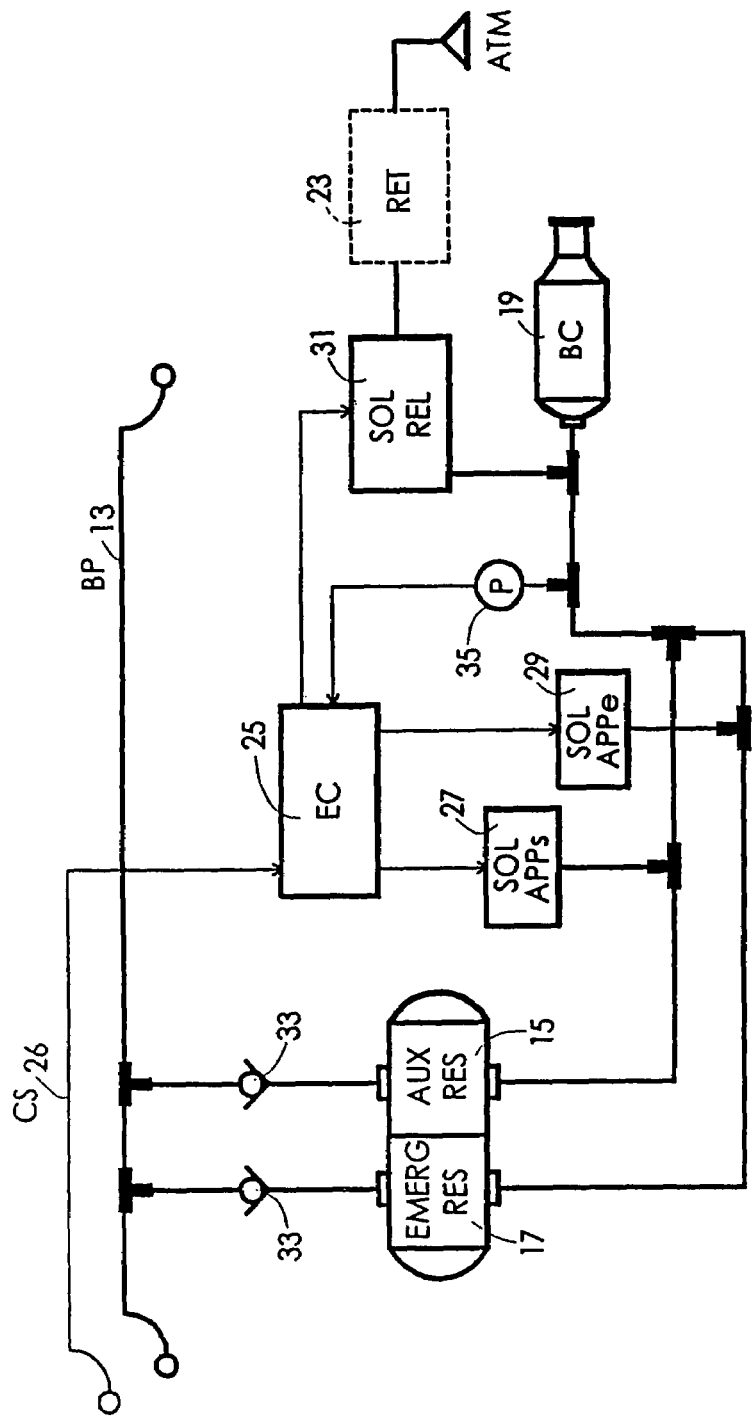
FIG. 2 is a diagrammatic representation which illustrates an combined ECP and pneumatic freight train braking system where the ECP is an overlay system for the conventional pneumatic braking system shown in FIG. 1.

To aid in understanding the present preferred embodiments it will be helpful to first describe certain prior art freight train brake control systems illustrated in FIGS. 1 and 2.

A conventional pneumatically operated freight train braking system on a railcar is shown in FIG. 1 wherein a pneumatic control valve ("PCV") 10 such as an ABDX, ABDW or DB-60 is connected to a brake pipe ("BP") 13 and auxiliary ("AUX") 15 and emergency ("EMER") 17 reservoir. Each reservoir is normally charged with pressurized fluid supplied by the BP 13 through auxiliary and emergency ports 11, 12 in the PCV 10. The PCV 10 is also connected to a fluid pressure activated brake cylinder device ("BC") 19 which applies friction brake shoes to the wheels of the car to control its speed. The PCV 10 also has an exhaust port 21 for venting the BC 19 to the atmosphere. Alternatively, the PCV 10 can be connected to a retainer ("RET") 13 through which brake cylinder pressure can be exhausted to the atmosphere at a restricted rate.

In operation, the PCV 10 senses changes in brake pipe pressure and, based upon such changes in pressure, can either apply the brakes by pressurizing the brake cylinder 19 with fluid from one or both of the reservoirs 15, 17 or, can release the brakes venting the brake cylinder 19. Conventionally, a reduction in brake pipe pressure signals the PCV 10 to apply the brakes in an amount proportional to the brake pipe reduction whereas an increase in brake pipe pressure of any amount above a small predetermined minimum is a signal to release the brakes completely, venting the BC.

A prior art combined ECP/pneumatic freight train brake control system is shown in FIG. 2 having an electronic controller ("EC") 25 which is operatively connected to the AUX 15 and EMER reservoirs 17 along with a pair of solenoid actuated application valves ("APP$_s$," "APP$_e$") 27, 29 for controlling the supply of pressurized fluid from the reservoirs to the brake cylinder 19 in order to apply the brakes on the railcar. The EC 25 is also connected to a solenoid actuated release valve ("SOL REL") 27 which can vent the brake cylinder 19 to the atmosphere. As in FIG. 1, a the RET 23 can also be provided.

In this system, the PCV 10 is used as a back-up brake control device while the EC 25 normally directly controls the brake cylinder pressure. Since the AUX 15 and EMER 17 reservoirs are charged with pressurized fluid directly from the brake pipe 13, backflow check valves 33 can be provided between each reservoir and the BP 13. Alternative ways known to those skilled in the art for preventing backflow from the reservoirs into the brake pipe can also be provided.

The EC 25 can monitor the brake cylinder pressure via a pressure transducer ("P") 35. In operation, the EC 25 can typically receive an electrical command signal ("CS") 26 from a locomotive which can instruct it to either apply or release the brakes. The level of increased or decreased braking can be communicated by both the CS 26 and/or the BP 13. The BP 13 can in some installations (not shown) communicates the brake command to the PCV 10 so that in event of any problems with the ECP system the PCV 10 can operate the brakes. Under normal conditions, to apply the brakes the EC 25 can actuate either or both of the application valves 27, 29 to supply pressurized fluid to the BC 19 from the reservoirs. To release the brakes, the EC 25 actuates the SOL REL 31 to vent the BC 19. The EC 25 can control the release of BC 19 pressure to provide incremental reductions in pressure (graduated release) without completely exhausting the brake cylinder as in the conventional pneumatic system.

Figure 3:
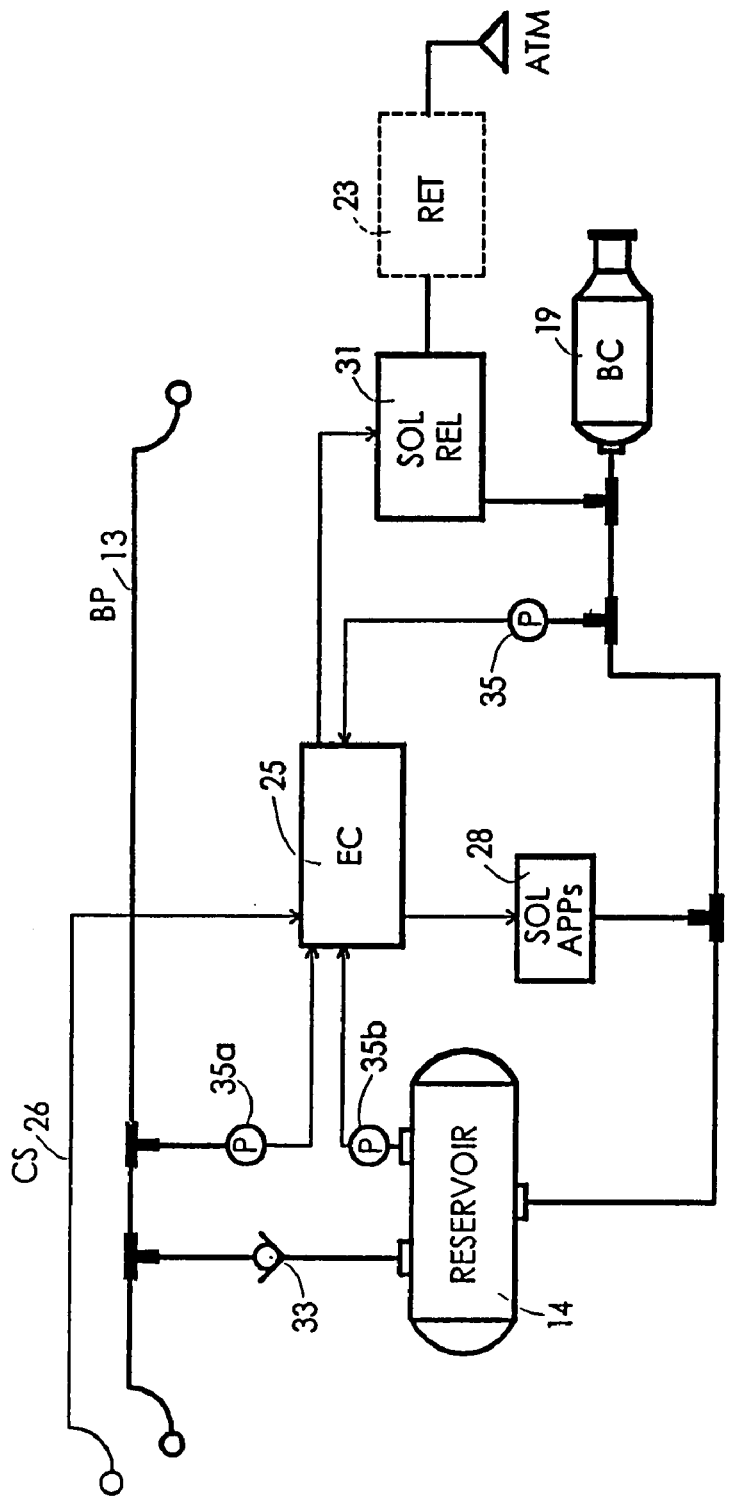
FIG. 3 is a diagrammatic representation which illustrates a prior art direct brake cylinder control fully ECP freight train braking system.

FIG. 3 illustrates a fully ECP brake control system, similar to the ECP system shown in FIG. 2 except that no PCV 10 is utilized. In this type of system, a single compartment reservoir 14 can be used for a couple of reasons. First of all, the PCV 10 requires separate AUX 15 and EM 17 reservoirs to operate. Without the PCV 10 the dual compartments are not needed. Also, in the fully ECP system the BP 13 pressure is maintained at full charge since all brake commands are sent to the EC 25 via the CS 26. Additionally, because a single reservoir is used only a single application valve "(APPN") 28 is needed. Like the ECP system of FIG. 2, the ECP system is of the BCC type in that the EC 25 can directly control the BC 19 pressure. Similarly, graduated release of brake pressure can also be provided by the EC 25.

In the pneumatically controlled freight train braking system shown in FIG. 1, wherein the braking functions are performed by the PCV 10, the BC 19 pressure is completely exhausted whenever a brake release is signaled (subject to the retainer system). The obvious disadvantage is that the level of braking cannot be partially reduced, it can only be fully exhausted. If the braking force is slowing the train too much, the engineer only has two choices: release the brakes completely or use power braking. Releasing the brakes completely means that there may be a certain period of time after the release before the brake pipe and reservoirs are recharged sufficiently, during which adequate braking force will be available. In the second case, power braking is inefficient and wasteful. Power braking is when the engineer leaves the brakes applied and applies power to increase the train speed against the brakes. This is clearly an undesirable procedure, however it may be the only option. For example, when the train is slowing too much yet the engineer knows that there is not be enough time for the brake pipe and reservoirs to recharge before braking is again required.

Figure 4:
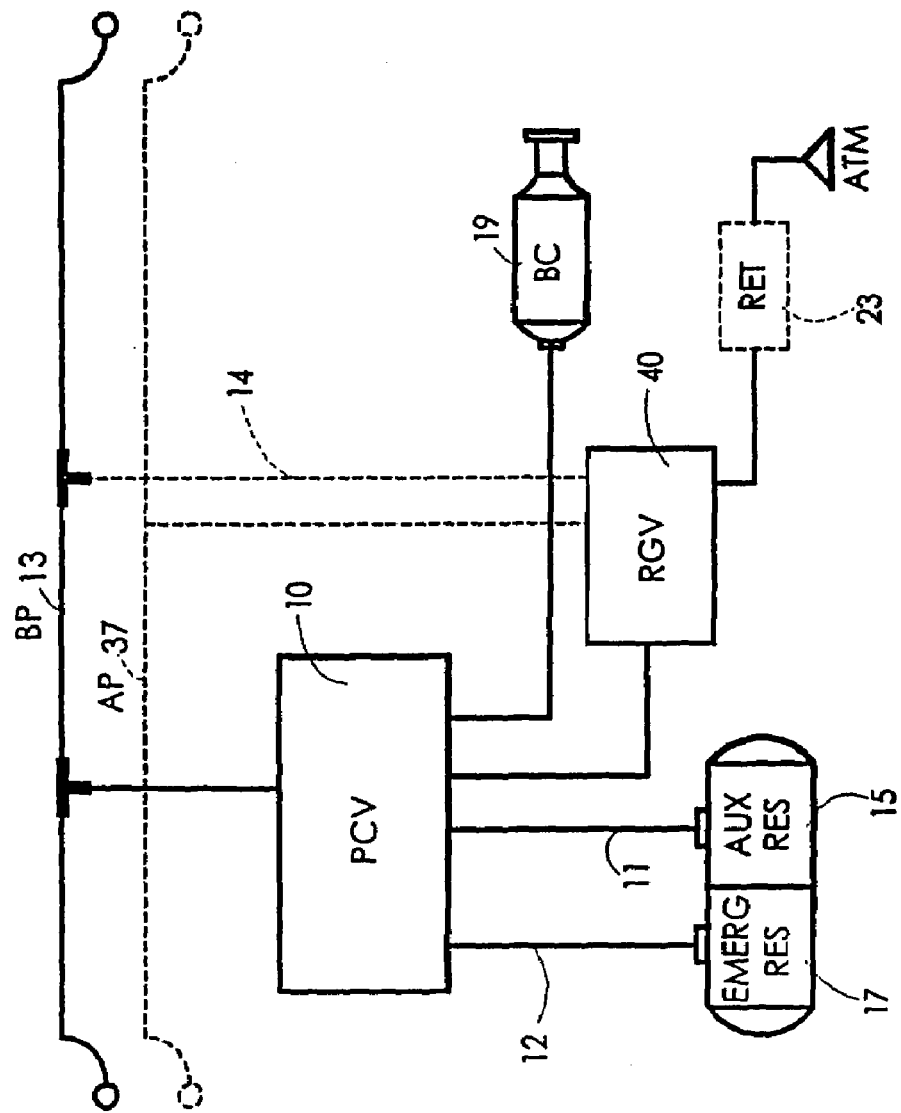
FIG. 4 is a diagrammatic representation which illustrates the pneumatic braking system of FIG. 1 further having a release graduating valve.

Referring now to FIG. 4, this advantages of graduated release can be provided by the use of a pneumatically functioning release graduating valve (RGV) 40. According to the invention, the RGV 40 can be operatively incorporated into the freight brake control system shown in FIG. 1 by simply connecting the RGV 40 to the PCV 10. Thus, whenever a release of brakes is signaled, the PCV 10 exhausts the brake pressure through the RGV 40 which controls the release of the brake pressure to the atmosphere in a graduated manner.

Figure 10:
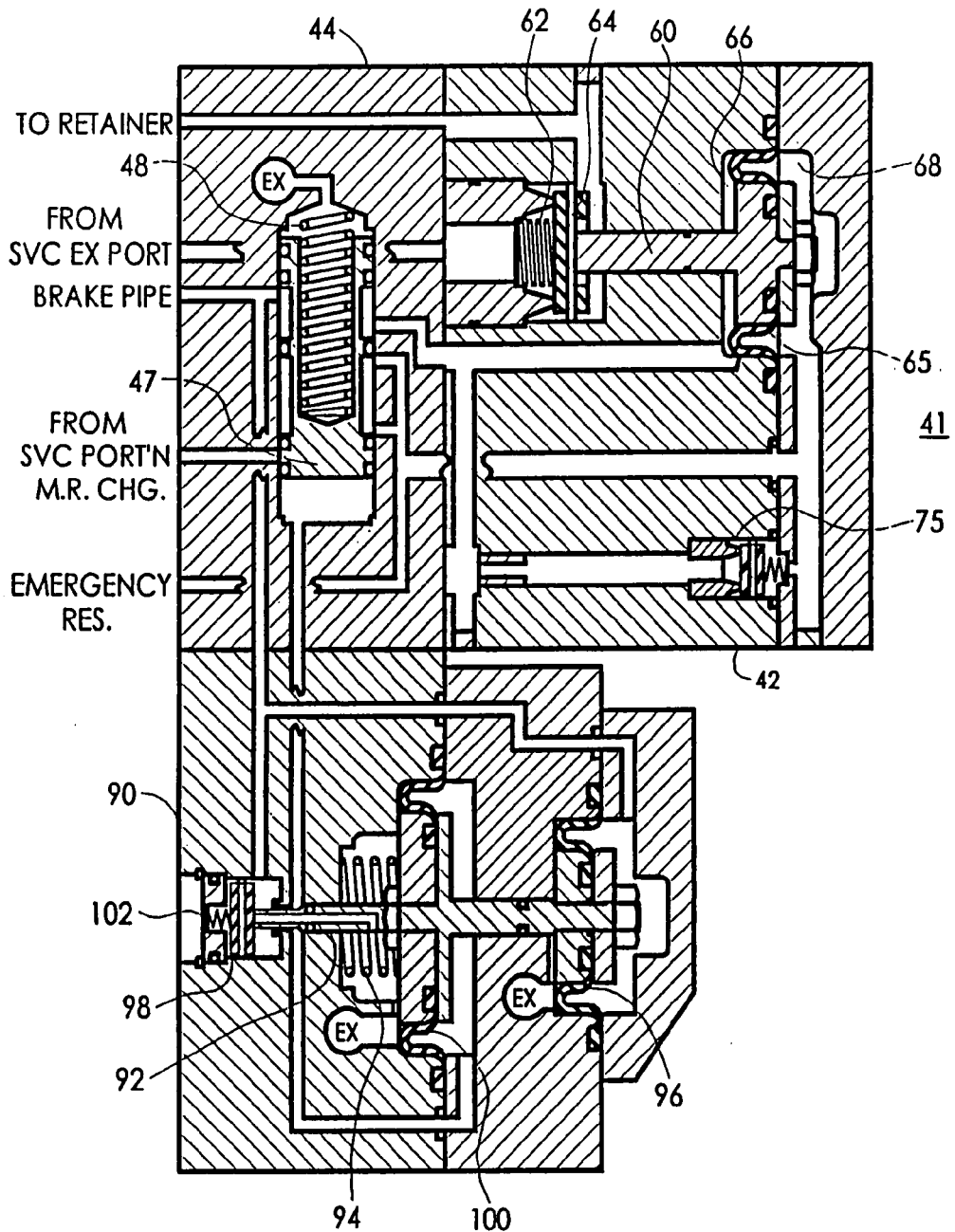
FIG. 10 shows the embodiment of FIG. 9 wherein the sensor valve has moved the changeover valve to the graduated release position.
Figure 11:
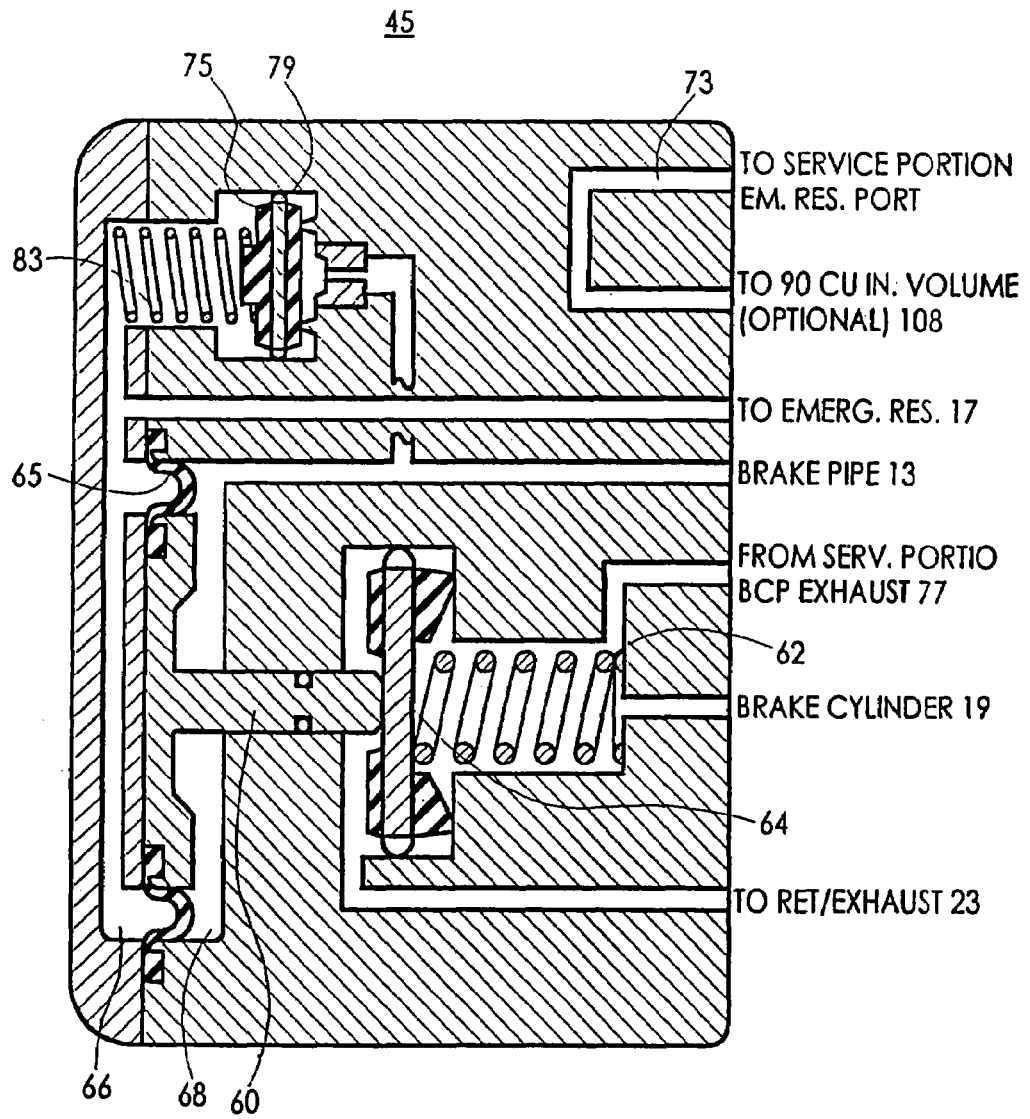
FIG. 11 shows an embodiment of a "permanent" release graduating valve.

The RGV 40 can be designed to operate either continuously or selectively. Presently preferred embodiments of selectively actuable RGVs 41, 43 are shown in FIGS. 5-10. A preferred embodiment of a "permanent," RGV 45, i.e. continuous graduated release mode, is shown in FIG. 11. The different embodiments will be described more fully below in connection with the corresponding drawing figures.

A selectively actuable RGV 41, 43 may be enabled in several presently preferred ways. A first way is that the cars in the unit train can be equipped with the aforementioned trainlined AP 37. The metering valve 42 will thus be interposed by changeover valve 44 which responds to pressure changes in the AP 37. Thus, the BPS valves may not be required.

Alternatively, the unit train might be equipped with a second locomotive or remote air compressor car located toward the rear of the train for improved brake pipe pressure control by either radio or direct wire, as is done with present remote controlled locomotives. The RGV 41 would include the BPS valve 90 for actuating the changeover valve 44 to interpose the metering valve 42. The additional compressed air source would permit the BP 13 pressure signals to be propagated more rapidly and the graduated release provided by the RGV 41, 43 would improve brake control and dynamic brake utilization. In this case a trainlined AP 37 would not be necessary.

Another alternative similar to the just described option is that, in the event that the unit train is short enough, the additional locomotive or compressor to provide BP 13 control at locations remote from the lead locomotive would not be required. The RGV 41 could be operated of the BP 13 via the BPS valves as explained above. Although the propagation of the BP 13 signals would not be as rapid, the RGV 41 would still provide a smoother release of the brakes and the possibility of better dynamic brake utilization.

An additional alternative for enabling the RGV 40 involves the use of a brake pipe control unit ("BPCU") which is an electrically controlled device connected at multiple selected locations remote from the locomotive along the BP 13. The BPCU includes solenoid valves for locally adjusting brake pipe pressure in response to a CS 26 in order to speed the propagation of a signal through the BP 13 to the PCV's 10 on each car. The BPCUs can be used with either the AP 37 or just the BP 13 as just previously described. The advantage being that the BP 19 signal is propaged significantly faster resulting in brake operations being carried out by the PCV 10 on each car more quickly and more in unison with every other car in the train. Briefly put, each BPCU device has or controls solenoid valves to either vent a certain amount of pressure from the BP 13 corresponding to a brake application command or put pressure into the BP 13 in response to a release command. In this system, multiple remote BPCUs are connected to the BP 13 at spaced apart locations along the unit train. Each BPCU receives electrical command signals CS 26 from the locomotive to either reduce or increase BP 13 pressure at that location along the BP 13. In doing so, the BP 13 signal is propagated through the train significantly faster than it could propagate unassisted. This type of system could be referred to as a brake pipe control ("BPC") type of ECP system since BP 13 pressure, as opposed to brake cylinder pressure, is controlled. The BCC is basically an electrically assisted pneumatic control system and can closely approximate the rapid and uniform brake application provided by the BCC type ECP system. Importantly, the BPC system retains the use of the proven, reliable, and common PCV 10 which is already provided on virtually all freight cars currently in service. Moreover, the use of the RGV 40 further enhances the BPC system by providing the additional feature of graduated release of brake pressure. Consequently, a BCC system, which is basically a conventional pneumatic system with the added BPCUs, that also utilizes an RGV 40 can provide virtually braking performance nearly the equal of the BCC type ECP system. Plus, this system requires only the limited electronic equipment needed for the BPCUs.

Figure 5:
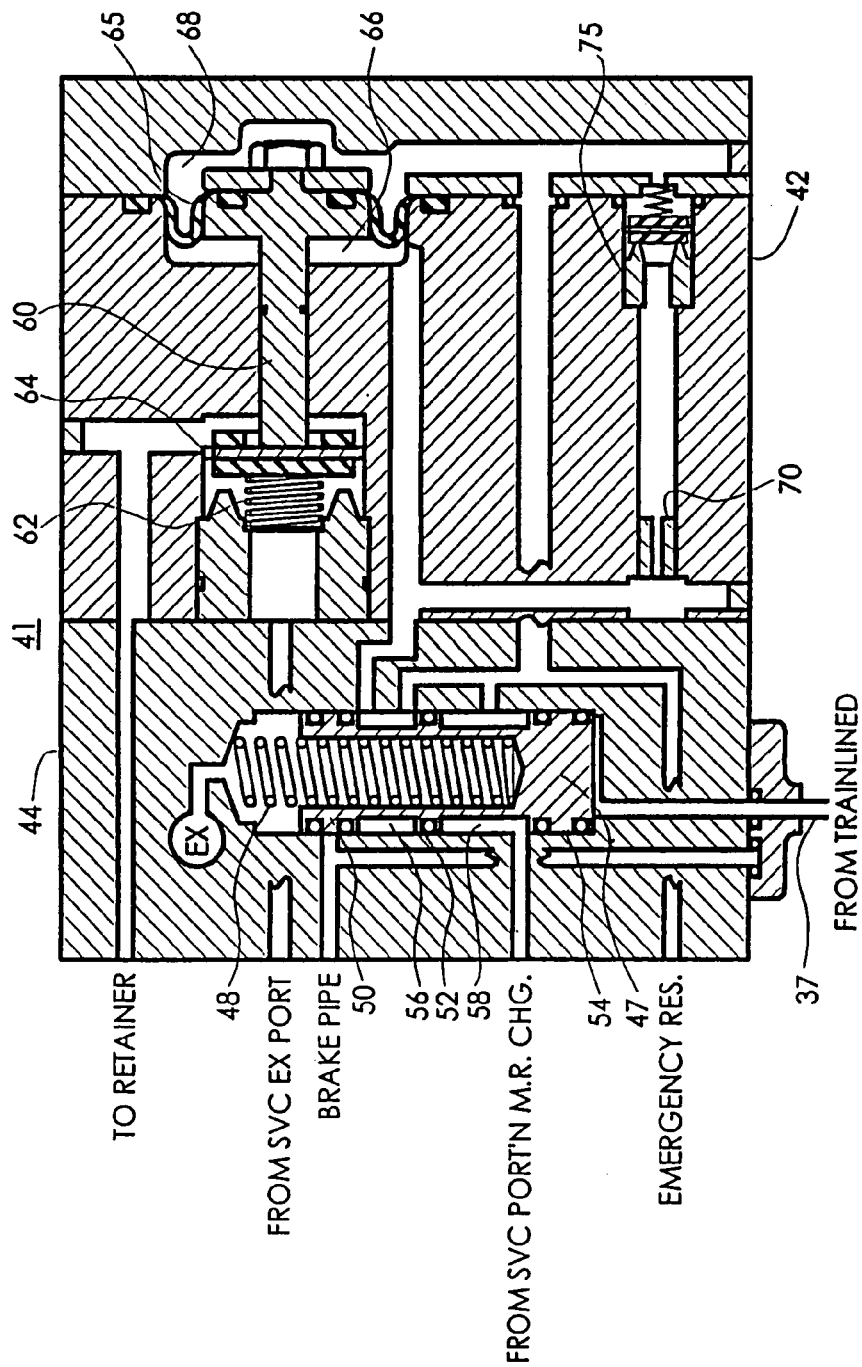
FIG. 5 shows an embodiment of a selectively actuable release graduating valve.
Figure 6:
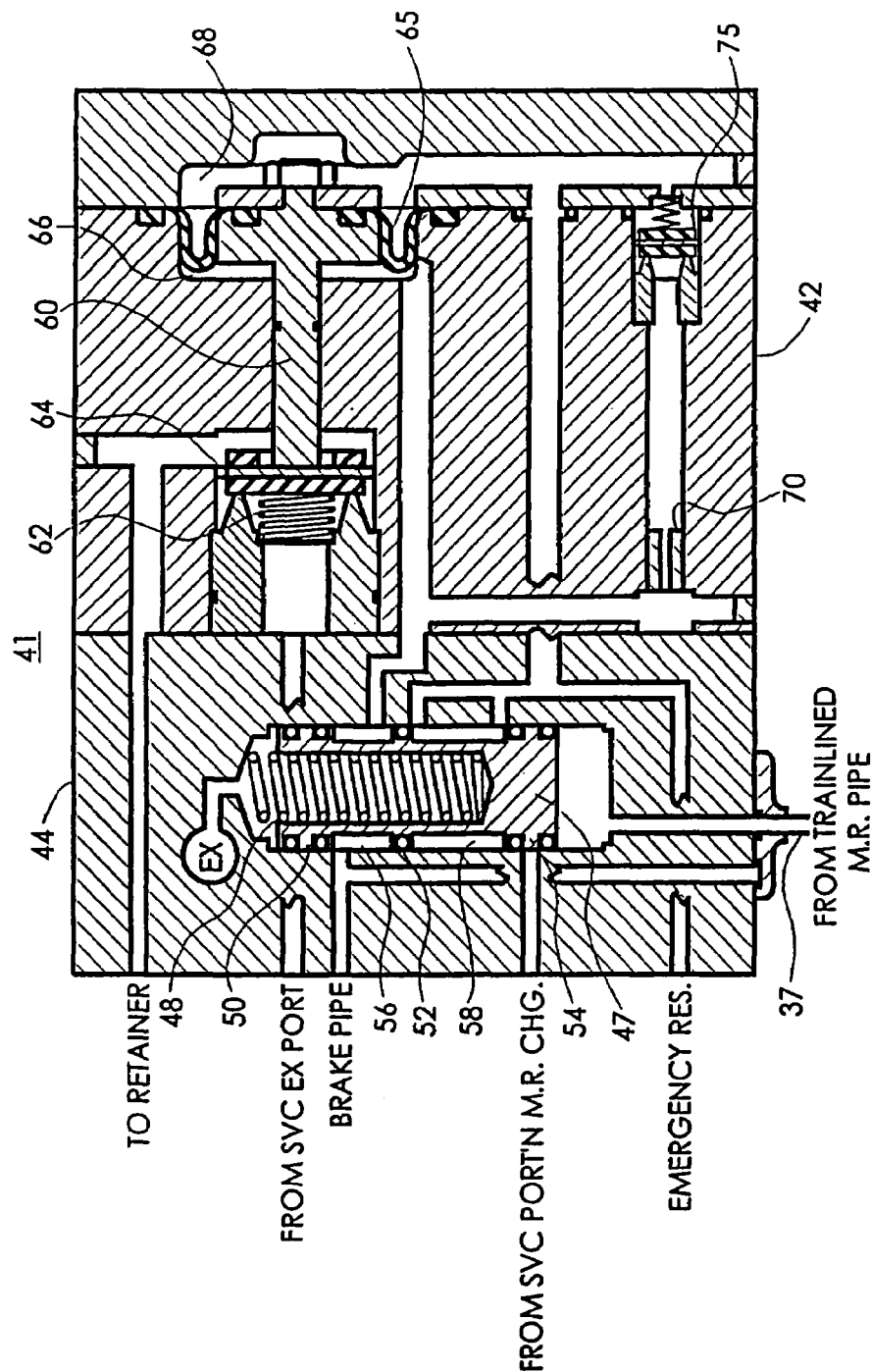
FIG. 6 shows the embodiment of FIG. 5 in a graduating release position.
Figure 7:
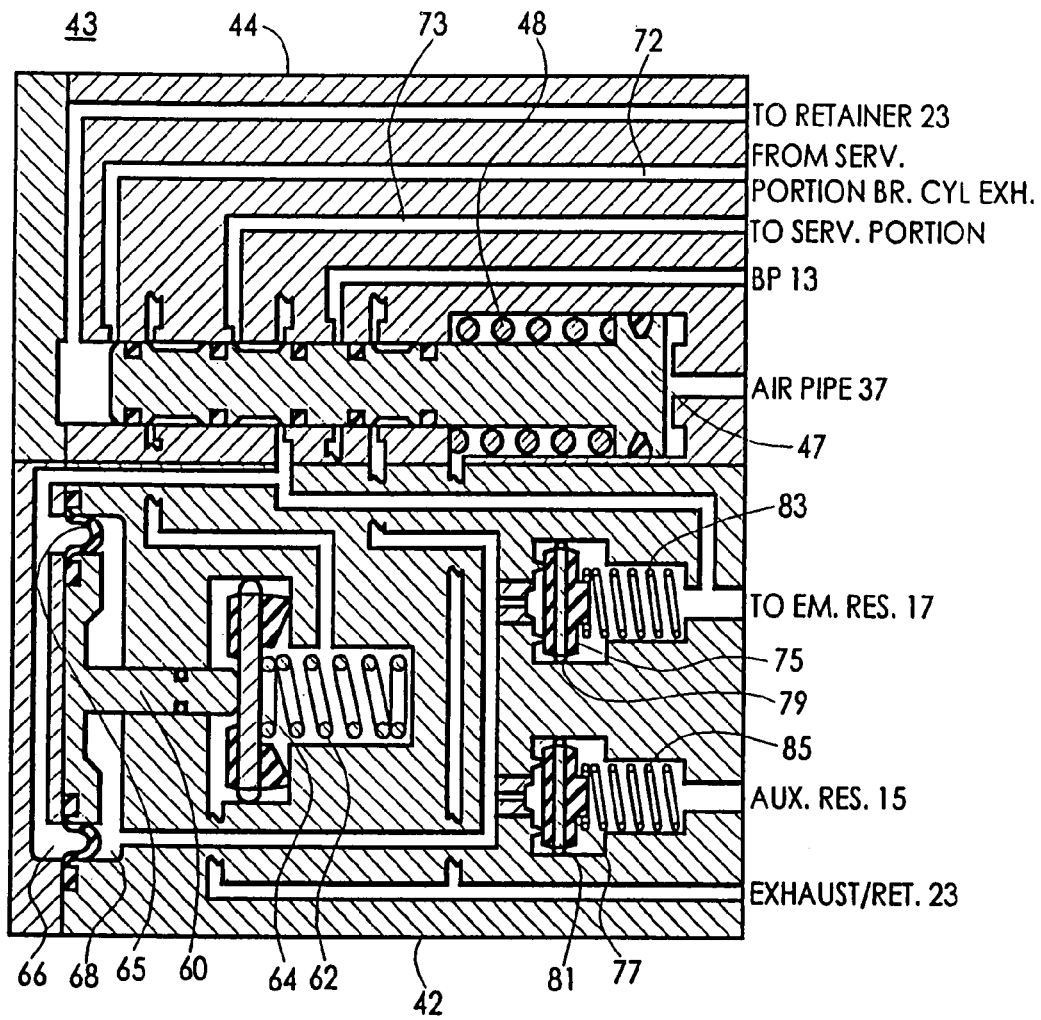
FIG. 7 shows another embodiment of a selectively actuable release graduating valve.

In the embodiment shown in FIGS. 5-7, the RGV 41, 43 can be selectively interposed into the system using the AP 37. Referring back to FIG. 4, the AP 37 shown in dashed lines, because it can be optional, may be a main reservoir pipe supplied with pressurized fluid from a locomotive. Pressure changes, and preferably a pressure in the AP 37 above a predetermined level, can be used to activate the interposition of the RGV 41, 43. When the pressure in the AP 37 is below the predetermined level, the BC 19 will be exhausted by the PCV 10 in a conventional manner.

Basically, the selectively operable RGV 41, 43 can have two separate valve portions. The first portion is a metering valve portion 42 and the second portion is a changeover valve portion 44. As shown in FIGS. 5-7, the changeover valve portion 44 is actuated by AP 37 pressure to switch between a graduated release position and a direct release position. Although the changeover valve portion 44 shown in the drawings utilizes a simple spool valve 47, alternate types of changeover valves could be satisfactorily employed.

In the graduated release position, the changeover valve 44 interposes the metering valve 42 to control the exhaust of the BC 19 during a release application by venting BC 19 pressure responsive to increases in BP 13 pressure. In the direct release position, the metering valve 42 is isolated from the BC 19 such that the PCV 10 controls the exhaust of BC 19 pressure in a conventional manner.

The main components of the metering valve 42 include a graduating piston 60, a graduating spring 62 and a graduating check 64. In the conventional direct release mode, shown in FIG. 5, the graduating piston 60 is subject to EMER 17 reservoir pressure on one side 68 and BP 13 pressure on the other side 66. In addition to BP 13 pressure, BC 19 pressure be can communicated on the same side 66 through a brake cylinder exhaust port 72 in the PCV 10 (see FIG. 7). In this particular configuration, the BC 19 pressure is communicated with the graduating piston 60 only when the PCV 10 moves to a release position which causes the BC 19 pressure to be connected through the port 72 in the PCV 10 to the metering valve 42.

As shown in FIG. 5, the RGV 41 is configured for conventional direct release operation because no air is present in the AP 37. This permits the changeover spool 47 to be held down by the changeover spring 48. Under this condition, the EMER 17 reservoir is charged, as is normal, from the service portion's emergency charging port, and air is available from EMER 17 reservoir to flow back through this port when accelerated service release is called for. Within the metering valve 42, BP 13 air is blocked by the upper land 50 of the changeover spool 47, and EMER 17 reservoir air is ported through the upper annulus 56 of the changeover spool 47 to the left side 66 of the graduating piston 60. Since EMER 17 reservoir air is always present on the right side 68 of the graduating piston 60, the piston 60 is essentially balanced, and the graduating spring 62 holds the graduating check 64 off its seat as shown, permitting unrestricted communication between the service portion's exhaust port 72 and the retainer pipe, so that when brake release is called for it will be unrestricted except by the RET 23 in the normal way.

When main AP 37 air is present, the situation is as shown in FIG. 6. As shown, the pressure in the AP 37 has forced the changeover spool 47 upward. In this position, the upper land 50 of the spool 47 uncovers communication with the BP 13, while the middle land 52 cuts off communication between the EMER 17 reservoir and the left side 66 of the graduating piston 60.

Consequently, BP 13 now communicates, through the spool's 47 upper annulus 56, with both the left side 66 of the piston 60 and, through the internal passages of the valve 44 and a control orifice 70, with the underside of the emergency reservoir charging check valve 75.

Finally, the lower land 54 of the spool 47 blocks communication from or to the service portion's emergency reservoir charging port 72, thus nullifying EMER 17 reservoir dumpback to BP 13 in service release so as to permit the gradual restoration of BP 13 pressure necessary to control graduated release operation.

This blockage would also prevent EMER 17 reservoir charging except for the provision of the charging check in the valve 75 which allows charging of the EMER 17 reservoir any time this reservoir's pressure is exceeded by that in the BP 13.

Charging of reservoirs and application of brakes is, from the car's standpoint, no different than the conventional pneumatic system. When brakes were released after an application, however, the pressure on the left side 66 of the graduating diaphragm 65 is 12-30 psi lower than that on the right side 68, allowing EMER 17 reservoir pressure, acting on the diaphragm's 65 right side 68 to overcome the graduating spring 62, shift the graduating piston 60 to the left and hold the graduating check 64 on its seat.

At this point however, as a result of the PCV 10 shifting to release, the full value of brake cylinder pressure is ported to the underside of the graduating check 64, where it acts on the check's 64 seat area and aids the graduating spring 62 in urging the check 64 off its seat. The seat diameter, spring force, and diaphragm area have all been so chosen that the forces tending to unseat the graduating check 64, under this condition will slightly overbalance the diaphragm force, thus allowing the check 64 to lift, and reducing brake cylinder pressure slightly until the unseating force (which decreases with decreasing brake cylinder pressure) is just balanced by the force on the graduating piston 60, at which point the graduating check 64 will seat and block further brake cylinder exhaust.

Note that in this balanced condition the graduating piston 60 stem force is only affected by the differential of EMER 17 reservoir over BP 13 (or for the condition of steady state emergency reservoir which would obtain during brake release, simply by the BP 13 pressure). Thus an increase in BP 13 pressure will reduce the differential, and upset the balance holding the graduating check 64 to its seat until brake cylinder pressure is again reduced, to the point where the check 64 again closes as described above, but at a lower BC 19 pressure. This action will continue throughout the brake release, providing gradual controlled decrease in BC 19 pressure in step with the gradual increase in BP 19 pressure. Further, since the initial release lowered the value of brake cylinder pressure by about 5 psi, this differential will be maintained, and complete release of brakes will occur at a BP 13 pressure about 5-8 psi lower than its initial value. This assures that all brakes will be released when brake pipe pressure is restored to its initial value on each individual car, permitting operation in a train having brake pipe taper without dragging brakes toward the rear.

Since some trains on which the system is intended to work may have augmented brake pipe pressure control, this latter feature will be more important in some operations than others, but will assure reliable brake release.

In the RGV 43 embodiment shown in FIG. 7, the BP 13 can communicate with both the AUX 15 and EMER 17 reservoirs through a pair of charging check valves 75, 77. This ensures that the EMER 17 reservoir will always be equal to or more highly pressurized than the BP 13 and also that the AUX 15 reservoir will be charged more quickly after a brake application. The reservoir charging check valves 75, 77 permit the transfer of pressurized fluid in only one direction—from the BP 13 into the reservoirs 15, 17. Each charging check valve 75, 77 includes a check plate 79, 81 which is biased by a check spring 83, 85 against the port into the BP 13. The check springs 83, 85 create a certain pressure differential which the BP 13 pressure must overcome before pressurized fluid is transferred into the reservoirs 15, 17. In particular, the check spring 85 for the AUX 15 reservoir check valve 77 can be provided in varying rates of stiffness to perform important functions regarding controlling the position of the PCV 10, with respect to application and release modes, as will be described more fully below in connection with the operation of the RGV 43.

As in the previously described RGVs 41, 43, the changeover valve 44 selectively interposes, or isolates, the metering valve 42 in response to the pressure in the AP 37 and exhausts pressure in the graduated release mode in the same manner described in connection with FIGS. 5-6.

The areas of each side of the graduating piston 60, along with the spring rate of the graduating spring 62, are preferably designed such that the forces on each side of the graduating piston 60 generally balance during braking applications so that the graduating check 64 is seated and no brake cylinder pressure is exhausted whenever BC 13 pressure is reduced. As explained above in connection with the prior art, a reduction in BP 13 pressure signals the PCV 10 to apply the brakes. Thus, when BP 13 pressure is reduced, the PCV 10 shifts to an application position and supplies an amount of pressure, proportional to the reduction in BP 13 pressure, to the BC 19 from the AUX 15 reservoir. Since the BP 13 pressure has decreased, the EMER 17 reservoir continues to hold the graduating check 64 closed so that no pressure is exhausted while the brakes are being applied. However, a subsequent increase in BP 13 pressure signals the PCV 10 to shift to release position which connects the BC 19 pressure behind the graduating check 64. The BC 19 pressure thus adds to the increased BP 13 pressure and results in a greater amount of force on the brake pipe side 68 of the graduating piston 60 than on the emergency reservoir side 66. This causes the metering valve portion 42 to exhaust a proportional amount of BC 19 pressure. The BC 19 pressure is exhausted until the forces on each side of the graduating piston 60 equalize again and the graduating check 64 returns to its closed position. The RGV 43 exhausts BC 19 pressure generally as a function of the BP 13 pressure since the amount of increase in BP 13 pressure is approximately the differential in pressure which overcomes the EMER 17 reservoir to open the graduating check 64. When a proportional amount of pressure is exhausted from the BC 19, the graduating piston 60 resumes its generally balanced state. If, after a graduated release of BC 19 pressure, a higher braking force is desired, the BP 13 pressure can be reduced again to signal the PCV 10 to supply proportionally more pressure to the BC 19. While the PCV 10 remains in an application mode, reductions in BP 13 pressure do not affect the graduating piston 60 because the EMER 17 reservoir pressure remains generally constant and holds the graduating check 64 closed such that no BC 19 pressure is exhausted. Consequently, the pressure in the BC 19 is captured and conserved which permits the level of braking to be either reduced or increased in incremental amounts at any time without the need to vent all of the pressure from the BC 19 each time.

As mentioned previously, the position of the PCV 10, in regard to application and release modes, during graduated release can be controlled by using, for example, the spring rate of the auxiliary reservoir check valve 77. This is so because the PCV 10 can typically be configured to switch between the release and application modes responsive to the pressure differential between the AUX 15 reservoir and the BC 19, and/or BP 13. Generally, the PCV 10, and specifically a service portion thereof, can be prevented from going to release by connecting the BP 13 to the AUX 15 reservoir. However in such a case the brake cylinder exhaust port 72 would have to be directly connected to the metering valve portion 42. The operation of a RGV 40 in such a configuration is described more fully in connection with an embodiment of the permanent RGV 45 below. Additionally, a more detailed description of the how the position of the PCV 10 can be controlled using the spring rate of the AUX 15 reservoir check valve spring 85 is also provided in connection with the description of the RGV 45.

In the event that remote locomotives or compressor cars are used as the brake pipe control augmentation means, there may be no trainlined AP 37 on the cars to operate the changeover valve portion 44. In this case changeover will be effected by BP 13 change and, as shown in FIGS. 3 and 4, the BP 13 would be connected to the RGV 40 via line 14. In particular, a BP 13 pressure of some amount above that carried on freight trains (90 psi max) can be used to signal the cars that the changeover valve portions 44 should be set for graduated release operation.

If BP 13 pressure is to be carried at 110 psi the pressure operated changeover feature shown in FIGS. 8-10 can be used to shift the changeover spool 47 to graduated position when a critical value of, say 95 to 105 psi is exceeded, and not to return it to direct release operation until BP 13 pressure drops below this point by a greater amount than required for a full service brake application.

Assuming that a fully charged BP 13 pressure of 110 psi was used, full service equalization would occur at 78.5 psi and it ought to be allowable for a 15 psi over reduction to be made. Thus the spool 47 should move up at a BP 13 pressure of 100 psi as above, and not move back down until the pressure had been reduced below 63 psi. The configuration shown in FIGS. 8-10 can accomplish this operation.

Figure 8:
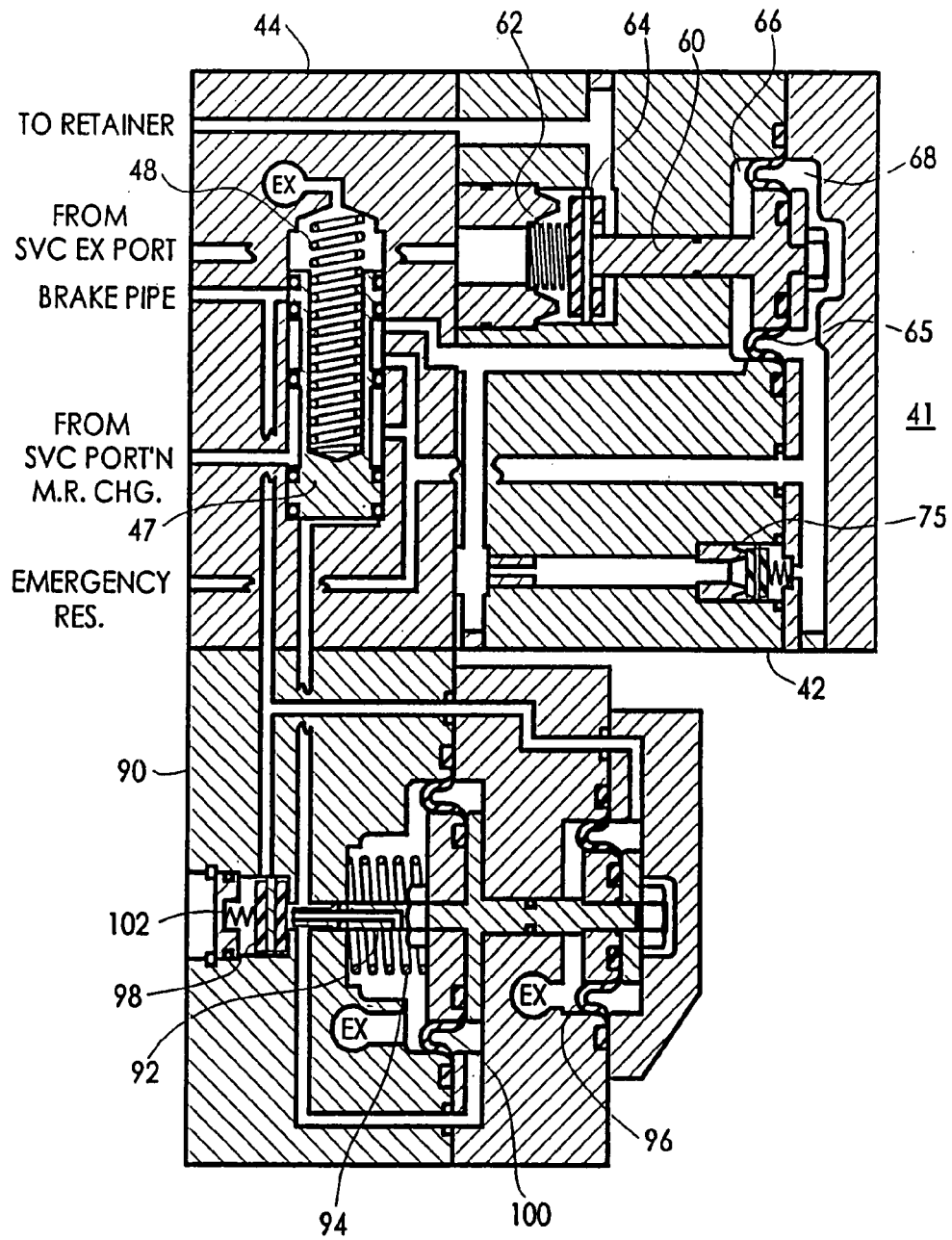
FIG. 8 shows the embodiment of FIG. 5 in a direct release position and further having a brake pipe sensor valve.

Referring to FIG. 8, the metering valve portion 42 and changeover valve portion 44 remain unchanged from the previous embodiments where their operation was described in connection with FIGS. 5-7. In this case however, the passage formerly used to connect the AP 37 to the underside of the spool 47 is instead connected with a brake pipe sensor (BPS) valve 90. FIG. 8 depicts the situation at initial charging wherein this passage is initially vented to atmosphere through the BPS 90 valve's pilot stem 92, into the sensing spring 94 chamber, thence to atmosphere through that chamber's permanently connected vent marked EX in the figure.

Note that BP 13 pressure is ported into the sensing valve 90, where it acts on the right hand side of the sensing diaphragm 96, urging the stem 92 to the left against the preloaded-sensing spring 94. At 100 psi, the force from the sensing diaphragm 96 will overcome the spring 94 moving the stem 92 to the left until its end contacts the face of the pilot check 98, as shown in FIG. 9.

Figure 9:
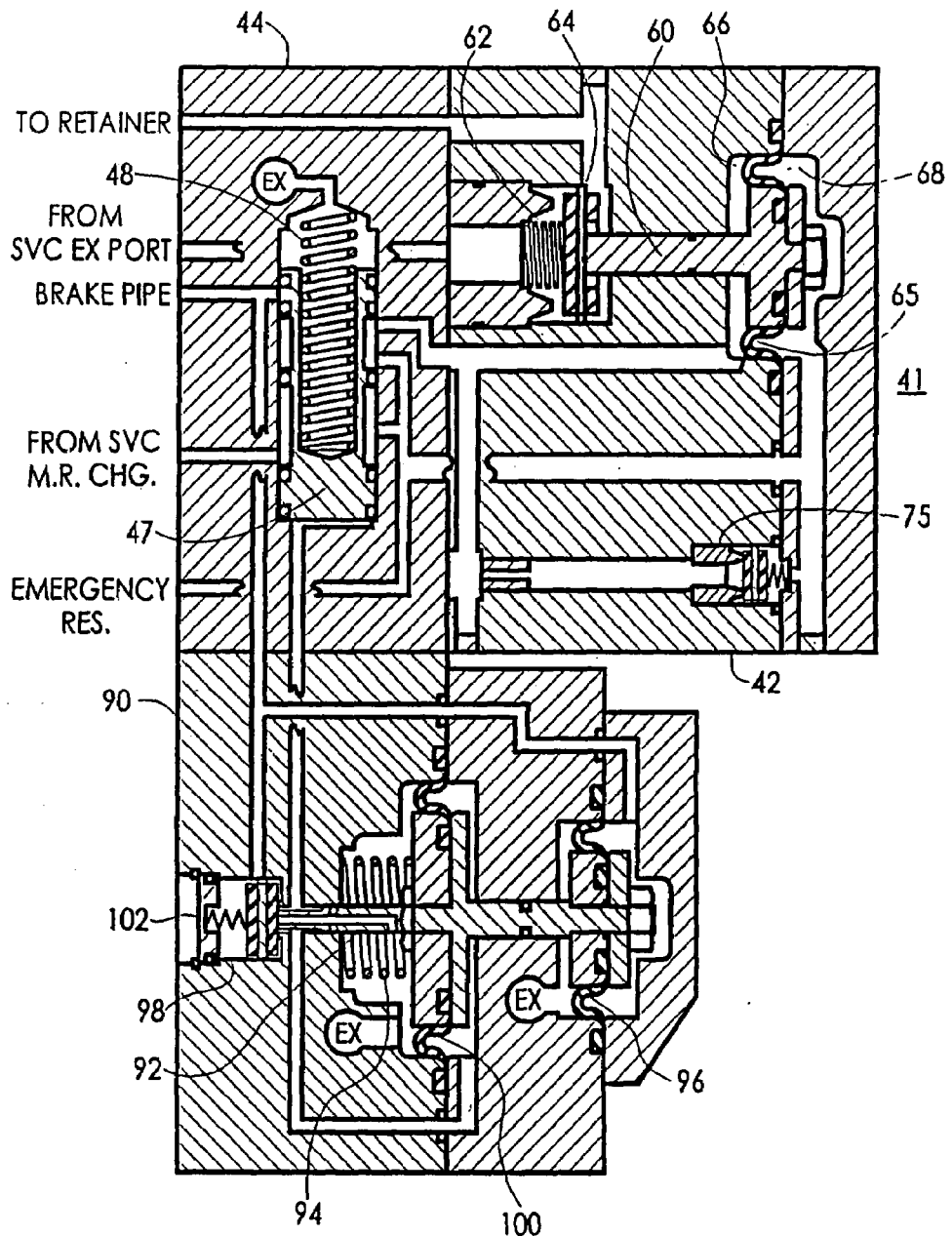
FIG. 9 shows the embodiment of FIG. 8 wherein the sensor valve is at the critical position.

FIG. 9 shows that the stem 92 has moved to contact the right hand surface of the pilot check 98, thus blocking communication between the passage to the bottom of the changeover spool 47 and atmosphere. Any leakage past the pilot check 98 will thus be trapped and will tend to fill this passage along with the chamber on the right hand side of the lockover diaphragm 100, with which it is in constant communication.

A slight further increase in BP 13 pressure will overcome the pilot check spring 102 and begin to unseat the pilot check 98 which will result in such a buildup. As this occurs, the lockover diaphragm 100 will add its force to that of the sensing diaphragm 96, forcing the check 98 further off its seat and resulting in a prompt movement of the stem 92 to its graduated release pilot position, as shown in FIG. 10.

In this position, BP 13 air flows both to the lockover diaphragm 100 face as explained above, and up the passage to the changeover spool 47 face, where it overcomes the changeover spring 48, and shifts the changeover valve 44 to the graduated release position.

With the changeover spool 47 in the graduated position, as mentioned previously, graduated release is enabled, EMER 17 reservoir charging is via the charging check 75 in the metering valve portion 42, and dumpback to BP 13 during service release is nullified.

When BP 13 pressure is reduced after the changeover point has been exceeded, as outlined above, which it must be during service brake application for example, the BPS valve 90 will not return to its original direct release position. Only when BP 13 pressure has been reduced to the point where the sum of the forces on both the sensing 96 and lockover 100 diaphragms is lower than the preloaded value of the sensing spring 94 can the BPS valve 90 reset to the direct release position.

Since the area of the lockover diaphragm 100 is equal to or greater than that of the sensing diaphragm 96, the pressure acting on the pair must be reduced to 50% or less than that which caused the shift. Thus if a 100 psi BP 13 charge shifts the BPS valve 90 to graduated release position, BP 13 pressure will have to be reduced below 50 psi for the BPS valve 90 to reset to direct release. As this is well below the 78 psi full service equalization from a 110 psi brake pipe, unintended shifting of cars back to direct release operation should not occur. Further, by increasing the size of the lockover diaphragm 100, the switch point from graduated to direct release may be made as low as desirable.

Figure 14:
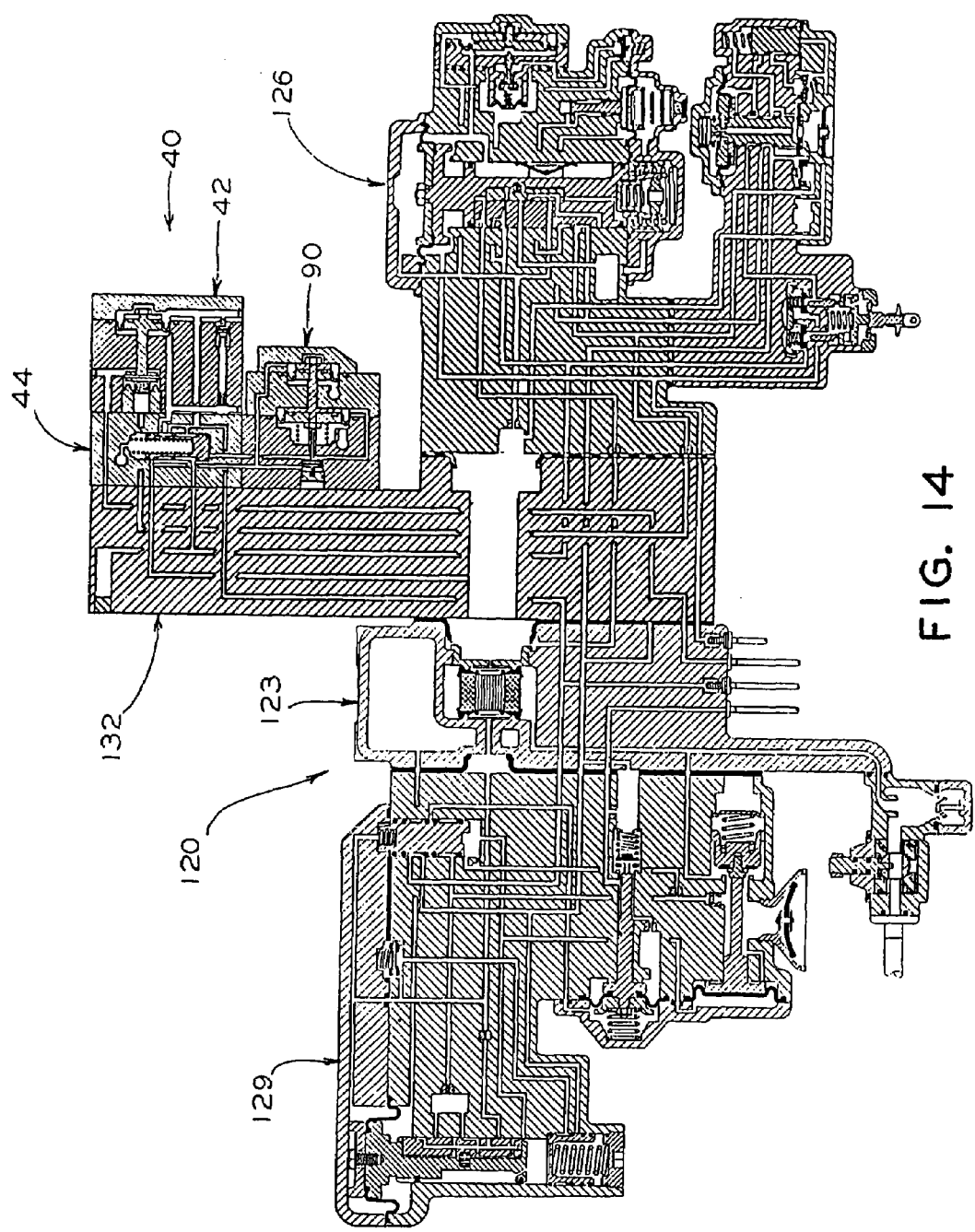
FIG. 14 illustrates an embodiment of an adapter plate for operatively connecting a release graduating valve to a type ABD pneumatic valve.

The BPS valve 90 described above can be easily mounted on a filling piece between the service portion and the pipe bracket face of a PCV 10, as shown in FIG. 14.

Referring now to FIG. 11, a continuous graduated release RGV 45 is incorporated into a pneumatically controlled freight brake system in the same manner as the selectively operable RGVs 41, 43—by connecting it to the PCV 10. However, in this configuration, there is no optional direct release mode and pressure from the BC 19 is always released in a graduated fashion. Such a permanent RGV 45 has no changeover valve 46 to selectively interpose the metering valve portion 42. The RGV 45 thus always vents the BC in a graduated manner whenever a release application is signaled. In this configuration, the AUX 15 reservoir charging check valve 77 can be eliminated. Additionally, the BC 19 exhaust can be ported directly to metering valve portion 42 along with the brake cylinder exhaust port 72 from the PCV 10. In other respects, however, the RGV 45 can function in much the same way as the selectively operable RGVs as shown in FIGS. 5-10. For example, the graduating piston 60 is subject to the same BP 13 pressure and BC 19 exhaust pressure on the brake pipe side 66 of the piston graduating piston 60 and to the EMER 17 reservoir pressure on the opposite side 68. One difference however is that BC 19 pressure is directly connected on the brake pipe side 66 of the graduating piston 60. This is in contrast to the selectable RGVs 41, 43 wherein the graduating check 64 is normally subject to BC 19 pressure only when the PCV 10 is in a release position and connects the BC 19 pressure to the metering valve portion 42 via the brake cylinder exhaust port 72 in the PCV 10. This modification to the RGV 45 can be made so that the RGV 45 can control the exhaust of BC 19 pressure whether or not the PCV 10 is in a release position. This can be necessary, since it may be desirable to prevent the PCV 10 from going to release when BP 13 pressure is increased in order to permit the RGV 45 to exhaust the BC 19. However, as referred to previously, the auxiliary charging check valve 77 in the selectively operable RGV 43 could be designed to prevent the PCV 10 from going to a release position during operation of the graduated release. In this case, the BC 19 exhaust would have to be routed directly to the RGV 43 in FIG. 7 similarly to the permanent RGV 45 shown in FIG. 11, for the same reason explained above.

If desired, the permanent RGV 45 can also operationally be provided with a port 108 which connects a relatively small volume of pressurized fluid, preferably about 90 cubic inches, to an emergency reservoir port 73 in the service portion of the PCV 10. The PCV 10 could feed portions of this volume into the BP 13 if a service accelerated release function is desired, thus increasing the BP 13 pressure by an additional 1 or 2 psi locally and serving as a release ensuring feature.

Generally, the metering valve portion 42 exhausts BC 19 pressure generally proportional to the increase in BP 13 pressure. Particularly, the graduating piston 60 is normally held by EMER 17 reservoir pressure in a position where no BC 19 pressure can be exhausted. On the other side of the graduating piston 60, the BP 13 pressure and BC 19 exhaust pressure urge the piston 60 against the EMER 17 reservoir pressure. Initially, the forces on each side of the piston 60 are generally balanced such that the graduating check 64 is held fast so that the BC 19 is isolated from the atmosphere. The RGV 40 is designed such that the graduating check 64 remains seated during brake applications. When a brake application is signaled by a reduction in BP 13 pressure, the PCV 10 supplies a proportional amount of pressurized fluid into the BC 19 from the AUX 15 reservoir.

Unlike the selectively actuable RGVs, in the RGV 45, the BC 19 is directly connected to the brake pipe side 68 of the metering valve 42. However, because this BC 19 pressure is generally proportional to the reduction in BP 13 pressure, the forces on each side of the graduating piston 60 remain generally balanced. Once the brakes have been applied, if a reduction in BC 19 pressure is desired the BP 13 pressure can be increased, thus signaling for a proportional reduction in BC 19 pressure. The increased in BP 13 pressure disturbs the balance, overcoming the EMER 17 reservoir pressure and causing BC 19 pressure to be exhausted. However, the graduating check 64 will only remain open until an amount of BC 19 pressure proportional to the increase in BP 13 pressure has been exhausted. When this happens the graduating check 64 seat again because the combined BP 13 pressure and BC 19 pressure will have once again equalized with the EMER 17 reservoir pressure. Thus, it can be seen that the pressure exhausted from the BC 19 is a generally a function of the increase in BP 13 pressure.

In addition to exhausting only a selectable portion of the BC 19 pressure, each particular embodiment the RGV 40 also makes it possible to incrementally increase the BC 19 pressure after a graduated release. For example, if increased BC 19 pressure is subsequently desired, a reduction in BP 13 pressure can signal the PCV 10 to supply more pressurized fluid to the BC 19. As explained above, a reduction in BP 13 pressure does not result in any BC 19 pressure being exhausted. Thus, BC 19 pressure can also be incrementally increased by the PCV 10. Furthermore, less additional pressurized fluid is required to be supplied to the BC 19 for increases in BC 19 pressure because there is already a certain amount of pressure captured in the BC 19 by the RGV 40. After such increase, if less BC 19 pressure is once again deemed desirable, a simple increase in BP 13 pressure can accomplish the exhaust of a proportional amount of BC 19 pressure in the manner described above. Consequently, the RGV 40 allows the BC 19 pressure to be incrementally adjusted, up or down, on demand. Plus, by conserving the pressure in the BC 19, less pressurized fluid from the reservoirs will be required.

Figure 12:
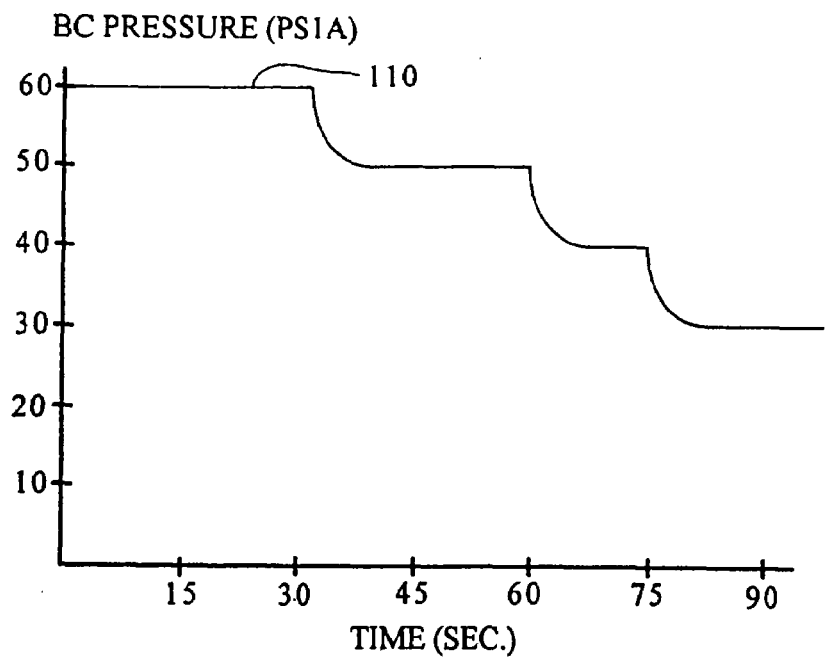
FIG. 12 is a brake cylinder pressure versus time graph which illustrates the type of braking control enabled by a release graduating valve.
Figure 13:
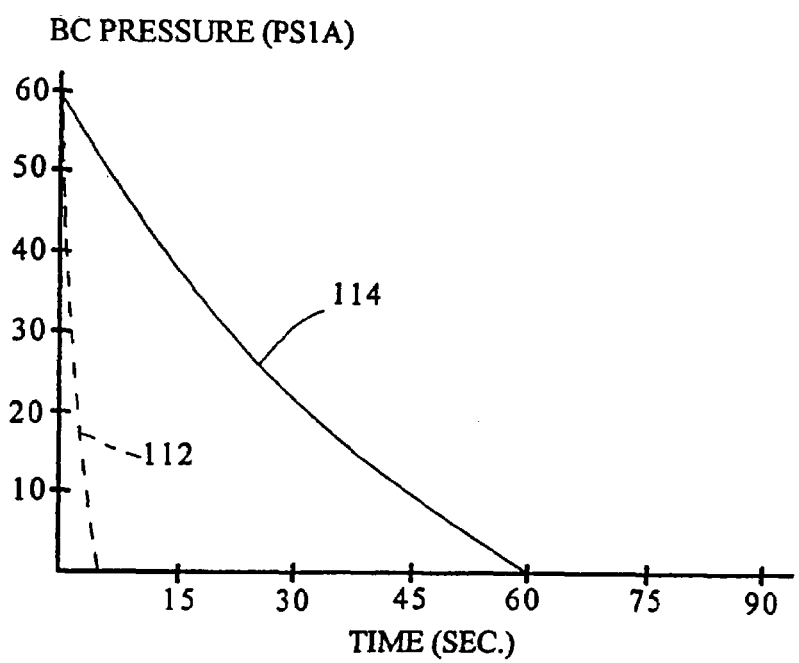
FIG. 13 is a brake cylinder pressure versus time graph which illustrates braking control using conventional braking systems.

The improved braking control provided by an RGV 40 according to the invention is illustrated in the "BC Pressure" versus "Time" graphs shown in FIGS. 12 and 13. Line 110 in FIG. 12 visually illustrates how the RGV 40 can incrementally reduce the pressure in the BC 19 without entirely venting the BC 19 to the atmosphere. The graph illustrates only the exhaust of BC 19 pressure by the RGV 40. It should be remembered that the BC 19 pressure can also be stepped up (using the PCV 10) and then stepped down again. In FIG. 13, two conventional methods of exhausting the BC 19 to atmosphere are represented by curves 112, 114. Curve 112 represents the exhaust of BC 19 pressure directly to the atmosphere. As can be seen, in a matter of a few seconds all of the pressure from the BC 19 is exhausted. In the case of using a RET 23, represented by curve 114, it can be seen that, although it may take longer, for example about sixty seconds, all of the pressure is nevertheless eventually exhausted from the BC 19.

Consequently, it can be easily understood how the RGV 40 can greatly improve the braking capabilities of a pneumatically controlled freight brake control system. Moreover, the BPC type ECP system having a RGV 40 can now include the advantages of the BCC type ECP system, including the incremental control over the brake cylinder pressure provided by the RGV 40, while maintaining the proven safety and reliability of the pneumatically controlled braking system.

FIG. 14 illustrates how a RGV 40 can be operatively connected to a type ABDX (or ABDX-L) pneumatic control valve 120. Similarly it can be used with a DB-60 type valve. The ABDX type control valve 120 manufactured by Westinghouse Airbrake Company typically includes a central pipe bracket portion 123, on one side of which is connected a service portion 126 and the other side of which is connected an emergency portion 129. The service portion 126 typically controls "service" braking applications, which are those braking applications calling for a BC 19 pressure below a predetermined level. The pressurized fluid from the AUX 15 reservoir is the normal source of pressurized fluid for such service braking applications. The emergency portion 129 and EMER 17 reservoir are normally reserved only for emergency situations where the train must be stopped as quickly as possible. Consequently, the RGV 40 is designed primarily for use in connection with service braking applications. Preferably, an interface plate 132 is provided between the service portion 126 and the pipe bracket 123. The interface plate 132 provides all of the requisite interconnecting ports such that the RGV 40 can simply be connected to the interface plate. An example of such an interface plate 132 is described in U.S. Pat. No. 5,451,099, assigned to the assignee herein and hereby incorporated herein by reference. The control valve with the interface plate and RGV attached can then be operatively incorporated into the freight brake control system as shown in FIG. 3.

System Operation

The operation of, for example, the RGV 43 shown in FIG. 7, is described below in more detail as it may be operated when connected to an ABDX valve in a unit train having a trainlined main reservoir pipe as the AP 37. The following details are provided only as an example so that the operation of such an RGV may be better understood and are not intended to be limiting to the scope of the invention which is entitled to the full breadth of the claims which follow the description.

With the RGV 45 connected to an ABDX valve and the AP 37 being a main reservoir pipe, the train brakes will automatically operate in conventional direct release unless the AP 37 is charged to main reservoir pressure. When the AP 37 is charged above 105 psi the changeover valve 44 automatically interposes the graduated release valve 43. Therefore, the AP 37 can be charged to main reservoir pressure (approximately 135 psi) when it is desired to operate in the graduated release mode; and it may either not be charged or charged to BP 13 pressure (up to a maximum of 100 psi) for operation in direct release.

Graduated Release

Three things occur when the changeover valve 44 activates graduated the release: (1) The brake cylinder exhaust port 52 from the service portion is routed to the RGV valve 43, permitting the RGV 43 to then control exhaust in accordance with any incremental increase in BP 13 pressure; (2) BP 13 pressure is admitted to the EMER 17 reservoir charging check valve 75 to handle recharging after emergency and to an AUX 15 reservoir charging check valve 77 to increase the rate of re-charging AUX 15 reservoir during a graduated release; and (3) EMER 17 reservoir is cut off from the ABDX service portion to nullify the release connection of EMER 17 reservoir to BP 13 and to also nullify service accelerated release. This allows small changes in train BP 13 pressure to be controlled from the locomotive and the ECP BP 13 pressure control units throughout the train (utilizing AP 37 pressure as a continuous high pressure air source).

When operating in graduated release, incremental BP 13 pressure reductions may be made at any time to increase service brake cylinder pressure. Although preliminary quick service bites will be taken out of BP 13 pressure each time a reapplication is made, imposing reductions of at least 1.5 to 2 psi, the continued presence of BC 19 pressure will nullify any quick service limiting valve activity.

In this example, there are at least two options for controlling the operating position of the ABDX valve during graduated release operation. The auxiliary reservoir check valve spring 83 may be set at about 2.5 psi, which would cause the service portion to move to release at the first increase in BP 13 pressure following an application. In this case the AUX 15 reservoir would be able to charge faster with any additional increase in BP 13 pressure, but would charge through the more restrictive charging choke at pressure differentials below 2.5 psi after going to release.

Alternatively, the AUX 15 reservoir charging check valve 77 differential may be set at about 0.5 psi, well below the service portion release differential, thereby allowing the connection of BP 13 pressure to AUX 15 reservoir to prevent the PCV 10 from moving to release position. In this case the actual BC 19 pressure line would be routed to the metering valve portion 42 and the changeover valve 44 would need to also cut off communication with the auxiliary reservoir charging check valve 77 when BC 19 pressure reduced to about 12 psi. This would then force the PCV 10 to release with any further increase in BP 13 pressure. It is presently believed that allowing the service portion to release would be the simpler and more reliable choice.

Where utilized, the distribution of multiple remote BPCUs 38 throughout the train would allow for a reasonably fast complete release of the brakes, even when the PCV's 10 are set to operate in graduated release. The BPCUs can be supported by AP 37 pressure. Testing would be required to determine the specific full release times, but this would not be a critical factor because all brakes would release generally simultaneously, eliminating the concern for creating undesirable slack action.

Recharging chokes provided between main reservoir and BP 13 and between BP 13 and AUX 15 reservoir would be set to provide a fast response, but without drawing the main reservoir pressure at the rear of a long train below the 105 psi graduated release threshold pressure. The use of 1-½ inch pipe for the AP 37 would maximize the flow capacity and minimize the pressure gradients during periods of high flow demand. If it were deemed necessary, the graduated release threshold could be reduced to 95 psi rather than 105 psi, limiting the BP 13 pressure to 90 psi when operating in direct release. Alternately, a large hysteresis could be designed into the changeover valve portion 44, so that once the AP 37 pressure exceeded the changeover pressure, it would need to be reduced substantially below that pressure to allow the changeover valve portion 44 to reset to direct release.

Inexhaustibility

Because BP 13 pressure will be reduced to apply the brakes, the full reservoir charge generally cannot be maintained, as is done with direct acting ECP brakes, i.e. a BCC type system. The inexhaustibility of the system is nevertheless still somewhat enhanced in that the AUX 15 reservoir is gradually, and relatively quickly, recharged along with the BP 13 during graduated release.

GRV Interface for ABDX Pneumatic Control Valve

Referring to FIG. 14, the RGV 40, which for this example can be the RGV 43, is preferably mounted to an interface plate 132 between the pipe bracket 122 and service portion 126 of an ABDX valve 120, intercepting the RET 23 and the EMER 17 reservoir port, and communicating with the other requisite ports. The changeover valve portion 44 is actuated by AP 37 pressure acting on changeover spool 47. When AP 37 pressure is below about 105 psi, the changeover valve portion 44 stays in a direct release mode, keeping all normal pneumatic connections to the service portion 126, including the connection of BC 19 exhaust to the atmosphere, or a RET 23. When AP 37 pressure exceeds 105 psi, overcoming the force of the changeover spring 48, the changeover spool 47 is moved to graduated release position wherein the metering portion 42 controls the exhaust of BC 19 pressure in a graduated fashion as a function of the BP 13 pressure.

In graduated release, the several port connections are changed. EMER 17 reservoir is cut off from the service portion 126 to prevent feedback of EMER reservoir to BP 13 following release. This also nullifies accelerated service release. Also, BP 13 pressure is admitted to both the emergency and auxiliary charging check valves 75, 77. This allows EMER 17 reservoir to be recharged without going through the PCV 10, and AUX 15 reservoir can be charged faster than normal after the service portion 126 releases. Finally, the brake cylinder exhaust port 72 from the service portion 126 is routed to the metering valve portion 42. The metering valve 42 traps and exhausts BC 19 pressure proportional to incremental increases in BP 13 pressure.

If necessary, it would be possible to link a small volume of about 90 cubic inches, as shown in FIG. 6, to the EMER 17 reservoir port 73 in the service portion 126 of the ABDX valve 120. In particular, this may be desirable where a permanent RGV 45 is employed. This volume would then feed into BP 13 if service accelerated release was triggered in the service portion 126, increasing BP 13 pressure by an additional 1 or 2 psi locally and serving as a release ensuring feature.

Brake Cylinder Pressures

The brake cylinder pressure chart, Table 1, shows some typical brake cylinder pressures for various brake pipe pressure reductions, from both 90 psi and 1110 psi.

TABLE 1

GRADUATED RELEASE VALVE BALANCE
Differential Pressure Controlled Valve

| ER PRESS | BP PRESS | BCP | Viv BCP | |
|---|---|---|---|---|
| 90 | 86.26 | 0.00 | 0.00 | Stem Dia. 0.25 |
| 90 | 80 | 20.65 | 20.65 | ER Area: 1.767144 |
| 90 | 75 | 37.15 | 37.15 | BPArea: 1.718057 |
| 90 | 70 | 53.66 | 53.65 | BCP Area 0.5205 |
| 90 | 66.4 | 65.54 | 65.53 | Spring: 10.85 |
| 110 | 106.83 | 0.00 | −1.88 | (Spring Optimized for 90 psi) |
| 110 | 100 | 22.54 | 20.65 | |
| 110 | 95 | 39.04 | 37.15 | |
| 110 | 90 | 55.54 | 53.65 | |
| 110 | 85 | 72.05 | 70.15 | |
| 110 | 81.76 | 82.72 | 80.8222 | |
| 90 | 85.70 | 0.00 | 1.3 | Stem Dia. 0.25 |
| 90 | 80 | 18.81 | 20.65 | D. Diam: 1.5 |
| 90 | 75 | 35.30 | 37.15 | ER Area: 1.767144 |
| 90 | 70 | 51.78 | 53.65 | BP Area: 1.718057 |
| 90 | 66.2 | 64.31 | 66.10 | BCP Area 0.521 |
| | | | | Spring: 11.8 |
| 110 | 106.27 | 0.00 | −0.06 | (Spring Optimized for 110 psi) |
| 110 | 100 | 20.69 | 20.65 | |
| 110 | 95 | 37.18 | 37.15 | |

TABLE 1-continued

GRADUATED RELEASE VALVE BALANCE
Differential Pressure Controlled Valve

| ER PRESS | BP PRESS | BCP | Viv BCP |
|---|---|---|---|
| 110 | 90 | 53.67 | 53.65 |
| 110 | 85 | 70.16 | 70.15 |
| 110 | 81.55 | 81.53 | 81.535 |

Included for comparison are the graduated release proportioning valve pressures and the nominal brake cylinder pressures normally provided by the control valve, for the same brake pipe pressure reductions. These pressures closely match, which means the brake cylinder pressure will be exhausted by the graduated release valve on the same track as it is applied by the control valve for any BP 13 pressure reduction, without significant hysteresis. This allows for indiscriminate incremental increases and decreases of brake cylinder pressure, without imposing any disruptively large steps during turnarounds. As various other embodiments of the invention are utilized, other valves will be used depending upon specific design configurations.

Following a pneumatic emergency application, emergency reservoir will provide a lower reference pressure for graduated release, fully exhausting brake cylinder pressure at a lower BP 13 pressure (with less increase) than normal. The reservoirs will then need to be fully re-charged to restore the normal graduated release pattern. This would not be expected to cause any significant problems, because the train will definitely be stopped during the release of an emergency application, and the system must be re-charged in any case.

Although certain embodiments of the invention have been described in detail, it will be appreciated by those skilled in the art that various modifications to those details could be developed in light of the overall teaching of the disclosure. Accordingly, the particular embodiments disclosed herein are intended to be illustrative only and not limiting to the scope of the invention which should be awarded the full breadth of the following claims and any and all embodiments thereof.

What is claimed is:

1. A method for controlling braking on a rail vehicle to selectively produce a graduated release of brake pressure, said railcar having a pneumatic control valve, a brake pipe, at least one reservoir normally charged from the brake pipe, and a brake cylinder device, said method comprising:
   a. controlling pressurization of said brake cylinder responsive to reductions in brake pipe pressure using said pneumatic control valve; and
   b. automatically switching between a graduated release mode and a direct release mode, wherein brake cylinder pressure is exhausted by metering said pressure to atmosphere in said graduated release mode, and said brake cylinder pressure exhausted to atmosphere in a conventional manner;
   c. sensing pressure in said brake pipe; and
   d. controlling said switching between said direct release and graduated release modes as a function of said pressure in said brake pipe.

2. The method of claim 1 wherein said metering comprises exhausting said brake cylinder pressure generally as a function of a pressure differential between said at least one reservoir and said brake pipe.

3. The method of claim 2 wherein said at least one reservoir further comprises an emergency reservoir portion and an auxiliary reservoir portion, and wherein said metering further comprises exhausting said brake cylinder pressure as a function of a pressure differential between said brake pipe and said emergency reservoir.

\* \* \* \* \*

UNITED STATES PATENT AND TRADEMARK OFFICE
CERTIFICATE OF CORRECTION

PATENT NO. : 7,306,294 B2 Page 1 of 1
APPLICATION NO. : 10/453130
DATED : December 11, 2007
INVENTOR(S) : James Hart and Thomas Engle It is certified that error appears in the above-identified patent and that said Letters Patent is hereby corrected as shown below:

Column 18, line 20, claim 1, after "atmosphere" insert --in said direct release mode--.

Signed and Sealed this

Twenty-fourth Day of June, 2008

JON W. DUDAS
*Director of the United States Patent and Trademark Office*